United States Patent [19]
Swierczewski

[11] Patent Number: 6,158,556
[45] Date of Patent: Dec. 12, 2000

[54] VEHICLE SAFETY MECHANISM FOR DISSIPATING COLLISION FORCES

[76] Inventor: Richard Swierczewski, 59 Oak Glen Rd., Toms River, N.J. 08753

[21] Appl. No.: 09/469,191

[22] Filed: Dec. 21, 1999

Related U.S. Application Data

[60] Provisional application No. 60/122,798, Mar. 3, 1999.

[51] Int. Cl.[7] .................................................... B60T 1/14
[52] U.S. Cl. .............................. 188/5; 293/6; 293/107; 188/8
[58] Field of Search ................................ 293/6, 107, 110, 293/118, 119; 188/5, 8

[56] References Cited

U.S. PATENT DOCUMENTS

| | | |
|---|---|---|
| 3,472,332 | 10/1969 | Halvajian . |
| 3,495,676 | 2/1970 | Graham . |
| 3,730,300 | 5/1973 | Scherenberg ................................ 188/5 |
| 3,768,599 | 10/1973 | Alexandre et al. ......................... 188/5 |
| 3,894,609 | 7/1975 | Wulf ........................................ 180/115 |
| 4,025,098 | 5/1977 | Powaska . |
| 4,167,225 | 9/1979 | Fragoso ..................................... 188/5 |
| 4,679,838 | 7/1987 | Mikina . |
| 4,786,459 | 11/1988 | Mundo . |
| 5,226,685 | 7/1993 | Chen . |
| 5,257,842 | 11/1993 | Sherno . |

FOREIGN PATENT DOCUMENTS

| | | |
|---|---|---|
| 868748 | 4/1971 | Canada . |
| 550635 | 12/1922 | France ....................................... 188/5 |
| 626314 | 5/1927 | France ....................................... 188/5 |
| 840973 | 1/1939 | France ....................................... 188/5 |
| 1454537 | 8/1966 | France ....................................... 188/5 |
| 1532736 | 6/1968 | France ....................................... 188/5 |
| 3049-418 | 9/1982 | Germany ................................... 188/5 |
| 302728 | 11/1932 | Italy .......................................... 188/5 |
| 57-095233 | 6/1992 | Japan . |
| 361337 | 11/1931 | United Kingdom . |
| 370746 | 4/1932 | United Kingdom ...................... 188/5 |
| 592295 | 9/1947 | United Kingdom . |

*Primary Examiner*—D. Glenn Dayoan
*Assistant Examiner*—Mickki D. Murray
*Attorney, Agent, or Firm*—Richard C. Litman

[57] ABSTRACT

A safety system for dissipating the forces involved in a vehicle collision comprises two large friction platforms beneath the vehicle unibody or floor pan, with each platform having an actuator between the platform and the overlying vehicle structure and connected to the platform by a series of struts or arms. The actuators are preferably automated and pyrotechnically actuated to drive the struts outwardly and downwardly, thereby driving the platforms downwardly beneath the vehicle and against the underlying surface to lift the vehicle slightly above the underlying surface. The vehicle may be surrounded by a plurality of bumper-like impact absorbing contact structures, with each structure also linked to a corresponding friction platform. The outer portion of each contact structure telescopes into the inner portion, and drives a series of struts connected to the corresponding friction platform. Each contact structure may also include a sensor for impact detection and linkage for triggering the actuators to drive the platforms. The safety system thus minimizes interaction between vehicle and another impacted object by progressive actuation of the trapezoidal contact structure and associated mechanisms, while maximizing interaction between vehicle and underlying surface by the actuator and friction platform. Alternatively, high spring rate compression springs may be provided in addition to the pyrotechnic actuation system, with the springs providing slower actuation for repeatable manual operation for securing the car against theft or holding the car in place on a grade or in slippery conditions.

20 Claims, 11 Drawing Sheets

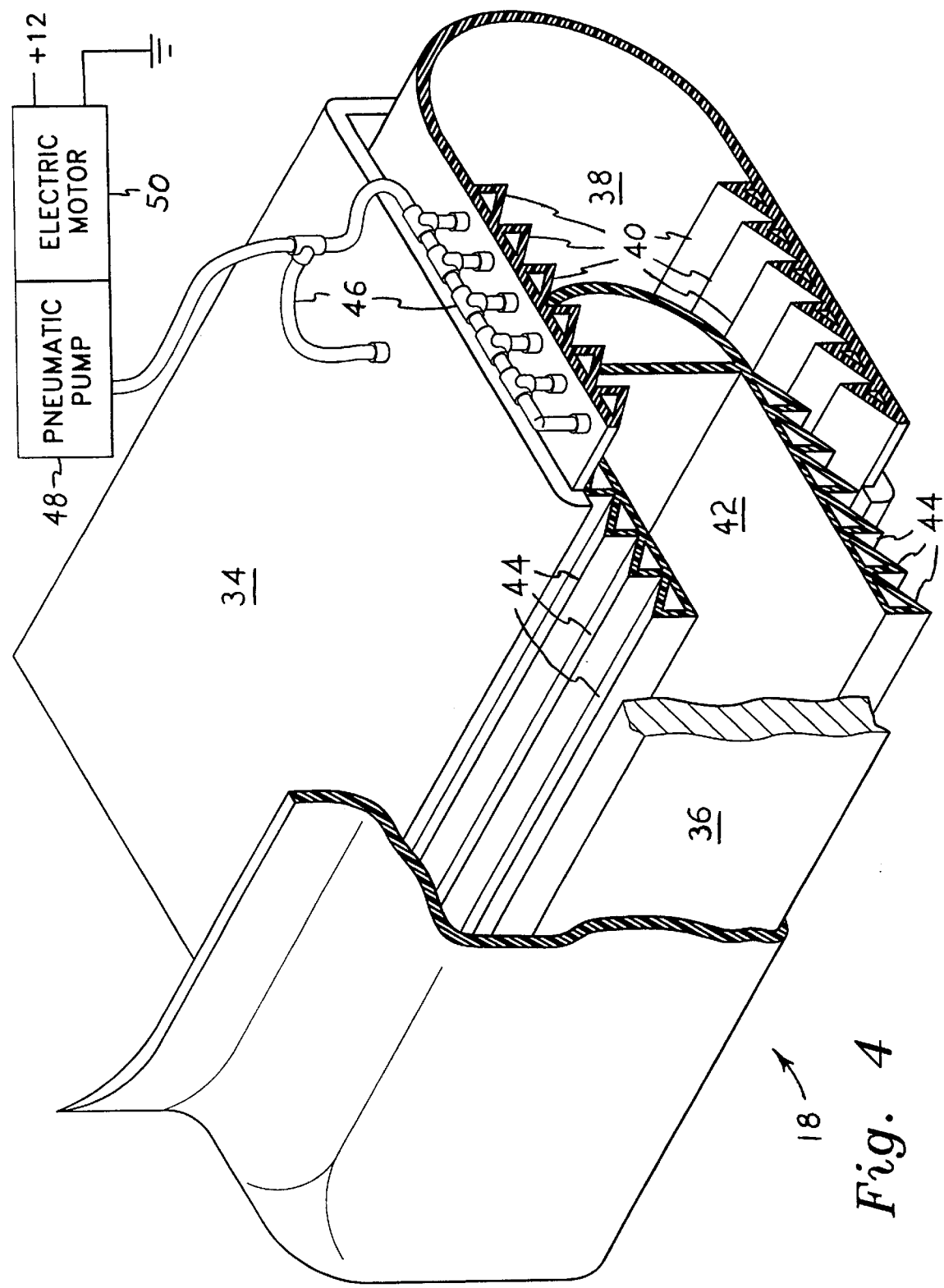

VEHICLE SAFETY MECHANISM FOR DISSIPATING COLLISION FORCES

REFERENCE TO RELATED PATENT APPLICATION

This application claims the benefit of U.S. Provisional Patent Application Ser. No. 60/122,798, filed on Mar. 3, 1999.

BACKGROUND OF THE INVENTION

1. Field of the Invention

The present invention relates generally to safety mechanisms and systems for powered land vehicles, and more specifically to a surface engaging system for dissipating the energy of a vehicle collision. The present invention generally comprises a surface friction platform which is automatically or manually lowered from beneath the vehicle to engage the underlying surface and provide frictional resistance. The downward force imparted also lifts the vehicle to at least some extent, thereby imparting additional downward force upon the friction platform.

2. Description of the Related Art

Modern motor vehicles have incorporated ever more sophisticated and numerous safety features (passive restraint systems, or "airbags," antilock braking systems, etc.) as technology has advanced. These features have generally come to be recognized as being critical to our transportation system as ever increasing numbers of vehicles crowd the roadways. A review of insurance statistics and rates indicates clearly that motor vehicle accidents and collisions are increasing, due to the ever more crowded road conditions. While the above noted safety features have provided a reduction in injuries and fatalities, they have done nothing to reduce the impact forces which are imparted to the vehicle (s) at the moment of a collision. Motor vehicles by their nature have relatively low rolling resistance, for efficiency and economy of operation. While modern tires and braking systems are capable of producing relatively high decelerative forces, the assumption here is that the vehicle operator will react to an impending emergency in time to stop the vehicle with such conventional systems.

Unfortunately, this is not always the case, and some form of device for automatically engaging the surface beneath the vehicle in the event of first contact, or perhaps automatically deploying such a surface engaging device according to remotely sensed distance and closing speed parameters, would be of great assistance in further reducing injuries and property damage due to vehicle collisions. Alternative manual deployment of such a device would provide other benefits as well, in reducing auto theft, preventing "rollaway" accidents, and assisting in other situations where it is critical that movement of the vehicle be stopped or prevented.

A discussion of the related art of which the present inventor is aware, and its differences and distinctions from the present invention, is provided below.

U.S. Pat. No. 3,472,332 issued on Oct. 14, 1969 to Edward M. Halvajian, titled "Combination Impact Cushioning Bumper And Automatic Roadway Brake," describes a linkage between a telescoping bumper and a plate, which causes the forward edge of the plate to drop downwardly and contact the surface underlying the vehicle. Only a relatively narrow transverse edge of the plate contacts the underlying surface, in comparison to the relatively large surface area of the contact plate of the present invention, in which a linkage causes the platform to descend essentially horizontally to contact the underlying surface essentially completely over its entire lower surface area. It is a well known physical principle that frictional forces increase with surface area, even when the total pressure remains the same. The present invention, with its large surface engaging area, provides considerable advantage over the Halvajian device. Moreover, the activation means of the present mechanism provides much more rapid and positive engaging of the device with the underlying surface, than does the Halvajian mechanism.

U.S. Pat. No. 3,495,676 issued on Feb. 17, 1970 to Phillip Graham, titled "Safe Vehicle Body," describes a vehicle in which the collapse of formed structures around the vehicle, cause the release of spring loaded struts which pivot downwardly to engage the underlying surface. Graham notes that the distal ends of the struts may comprise spikes or shoes, but in either case, the surface contact area is considerably smaller than the large platform area provided by the present invention.

U.S. Pat. No. 4,025,098 issued on May 24, 1977 to Tadeusz Powaska, titled "Bumper Assembly For A Motor Vehicle," describes a bumper system incorporating shock absorbing lateral bumpers which shock absorbing actions are independent of one another, and telescoping front and rear bumpers which are interconnected with one another, i.e., an impact compressing the front bumper also causes the rear bumper to retract, and vice versa. Powaska does not disclose any mechanism for engaging the surface beneath the vehicle, either by impact with his bumper system or in any other way, as opposed to the present automated surface engaging system.

U.S. Pat. No. 4,679,838 issued on Jul. 14, 1987 to Stanley J. Mikina, titled "Vehicle Collision Bumper," describes a mechanism wherein a collapsing input on a bumper results in a torsional force being imparted to an elastomer coupling, which produces a restorative force to extend the bumper after impact. A ratchet mechanism is included, with retractile force on the bumper resulting in the rotation of the ratchet wheel holding the elastomer coupling. Mikina does not disclose any form of device for frictionally engaging the surface beneath the vehicle, either due to bumper collapse or otherwise, whereas the present invention includes such undersurface frictional engaging means as one of the main objects of the invention, particularly including means for triggering the deployment of the surface engaging device when one of the contact frames of the vehicle is collapsed, or when other detecting means are used to trigger the deployment of the device.

U.S. Pat. No. 4,786,459 issued on Nov. 22, 1988 to James D. Mundo, titled "Vehicle Impact Energy Absorber," describes a helically threaded post supporting the bumper and engaging a mating threaded sleeve. The sleeve is frictionally held within the bumper. When an impact occurs, the sleeve is forced along the threaded post, and its rotation is restricted by the frictional clutch means holding it in place in the bumper. However, Mundo does not provide any means for engaging the surface beneath the vehicle, nor any means for his bumper mechanism to trigger the deployment of such a surface engaging friction platform, which platform and deployment means are a part of the present invention. U.S. Pat. No. 5,226,685 issued on Jul. 13, 1993 to Yung-Hsing Chen, titled "Collision-Avoidance Safety Apparatus For A Car," describes a generally U-shaped bar which may be pivotally mounted between its arms at each end of a car or other motor vehicle. The crossmember of the U extends outwardly from the bumper, with the arms extending somewhat downwardly beneath the vehicle structure. When an impact occurs, a force vector deflects the upwardly oriented crossmember further upward, thus causing the arms to swing downwardly and contact the underlying surface. However, the Chen system teaches away from the present invention, in that Chen provides wheels at the ends of the downwardly swinging arms, rather than braking means. Thus, a vehicle equipped with the Chen device would have no means of stopping in the event of brake malfunction, either as a result of a collision or due to mechanical failure. The present invention provides a positive braking system.

U.S. Pat. No. 5,257,842 issued on Nov. 2, 1993 to Stanley A. Sherno, titled "Collision Impact Absorber," describes a device much like that of the '685 U.S. patent to Chen, discussed immediately above. The Sherno device differs in that it is pivotally mounted to the vehicle structure behind the bumper, and extends forwardly and downwardly outside the bumper. An impact produces a downward force component on the lowered outer end, which translates to an upward force component to the vehicle. This lifts the impacted end of the vehicle. However, the Sherno mechanism does not provide any means of engaging the underlying surface of the vehicle with his device, and thus cannot provide any braking action, as is provided by the present invention.

British Patent Publication No. 361,337 accepted on Nov. 18, 1931 to Aladin A. Silva, titled "Improvements In Automatically Operated Brakes For Vehicles," describes a system of three shoes or drags which drop from beneath the vehicle when triggered by a bumper impact. The bumper is mounted on arms which are in turn pivotally attached to a crossmember extending between the two front leaf spring suspension attachment points. The Silva bumper thus must pivot downwardly to release the drags, rather than moving rearwardly to trigger the actuation of the braking means, as in the present safety device. Moreover, the pivotally mounted drags of the Silva device differ from the friction platform(s) of the present invention, in that the present platform(s) provide a considerably larger surface contact area and remain parallel to the underlying surface at all times for increased braking efficiency.

British Patent Publication No. 592,295 accepted on Sep. 12, 1947 to Arthur J. Davies, titled "An Automatic Brake And Stop, For Motor Vehicles," describes a mechanical system which is activated either by bumper contact with another object, or by activation of a lever inside the vehicle. Movement of the lever (either by means of rearward movement of the front bumper which is connected to the lever, or by the vehicle operator) triggers the release of a pair of rearwardly pivotally mounted arms or struts, the forward ends of which fall from beneath the vehicle to jam against the pavement and which cause the front of the vehicle to lift due to the forward motion of the vehicle. Thus, the system of the Davies '295 British Patent Publication is more closely related to the system disclosed in the Graham '676 U.S. patent discussed further above, than to the present invention with the large area of its surface engaging friction platform.

Canadian Patent No. 868,748 issued on Apr. 20, 1971 to Franklin Goggins, titled "Antiskid Apparatus For A Vehicle," describes various embodiments of auxiliary wheels, casters, rollers, and/or skate blades which are normally retracted, but which may be selectively extended to provide supplemental braking, steering, or other effects as desired. The two most notable distinctions between the Goggins systems and the present invention are (1) Goggins provides supplementary low friction means (wheels, etc.), while the present invention is directed only to a supplementary friction brake; and (2) the Goggins systems require manual activation, whereas the present system may be automated.

Finally, Japanese Patent Publication No. 57-95233 published on Jun. 14, 1982 to Riyouji Munetou describes (according to the English abstract) a rear wheel chocking system, triggered by frontal impact and rearward movement of the front bumper. When the bumper moves rearwardly upon impact, it actuates a linkage to cause the chocks to drop downwardly in front of the rear wheels. The system is automated, as is the present system, but relies only upon stopping rotation of the rear wheels by chocking them. In contrast, the present invention provides one or more surface engaging friction platforms of larger area, which automatically drop to engage the underlying surface below the vehicle. The present system does not affect the conventional vehicle wheels or tires in any way, as does the device of the Japanese publication.

None of the above inventions and patents, either singly or in combination, is seen to describe the instant invention as claimed.

SUMMARY OF THE INVENTION

The present invention comprises a manually or automatically deployed mechanism for dissipating vehicle collision forces, essentially comprising two or more relatively large platforms normally stowed beneath the body structure of the vehicle. The present system operates by driving the platforms downwardly against the underlying surface, with the reaction serving to lift the vehicle slightly above the underlying surface (pavement, etc.).

An actuator is positioned between each platform and the overlying body structure (unibody, floor pan, etc.), and is linked to the platform by a series of struts or arms. The actuator may be triggered automatically by conventional impact sensor means (as used in airbag deployment, etc.) and drive the struts and platform downwardly by pyrotechnic means.

Alternatively, the vehicle may be equipped with front, rear, and/or side contact structures or actuating means positioned at uniform heights, which are connected to the friction platforms by struts. These contact structures take the place of conventional bumpers and comprise two generally trapezoidal sections with one telescoping into the other, with the outermost portion seating within the inboard portion and with resilient members engaging one another between the two sections. An impact upon these peripheral actuators also serves to drive the platform(s) downwardly. The peripheral actuators may trigger a sensor which is linked to a pyrotechnic device for driving the inner struts downwardly, with the sensor and pyrotechnic technology being based upon conventional airbag or other pyrotechnic detonator type technology. The effect of the above described structures is to minimize the interactive forces between the vehicle and another impacted object by means of the progressive actuation of the trapezoidally configured contact structure and associated mechanisms, while maximizing the interaction between the vehicle and the underlying surface by means of the actuator and friction platform systems.

While the automated actuation means is preferably driven by pyrotechnics, the present invention also provides for manual activation, if so desired. A compression spring having a high spring rate is installed within the cylinder of each actuator, and may be released by the vehicle operator as desired for securing the vehicle against theft in a parking area, preventing the vehicle from sliding, and/or for any other reason in which nearly instantaneous operation is not required.

Accordingly, it is a principal object of the invention to provide an improved mechanism for dissipating vehicle collision forces, comprising at least a forward and a rearward friction platform disposed beneath the vehicle for driving downwardly against the underlying surface to hold the vehicle in the desired position in the event of an accident.

It is another object of the invention to provide an improved collision force dissipating mechanism including an actuator situated between each platform and the overlying vehicle structure, with the actuator being linked to the respective platform by a series of struts or arms.

It is a further object of the invention to provide an improved mechanism for dissipating collision force including front, rear, and/or laterally disposed peripheral force absorbing means, including a telescoping structure linked to the platforms and serving to drive the platforms downwardly for supporting the vehicle thereon.

Another object of the invention is to provide an improved mechanism as a vehicle safety component which cushions and delays the reaction of the vehicle during impact until the contact structure and vehicle become a monolithic mass, with the time until the convex movable portion of the contact structure engages its concave frame utilized for activation of the friction platform.

An additional object of the invention is to provide an improved mechanism for dissipating collision force, including pyrotechnic and compression spring deployment means.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 4 is a broken away perspective view of one of the forward or rearward rigid frame contact structures of the present system, showing various details thereof.

Similar reference characters denote corresponding features consistently throughout the attached drawings.

DETAILED DESCRIPTION OF THE PREFERRED EMBODIMENTS

The present invention comprises a mechanism for dissipating collision forces to a motor vehicle, generally comprising a pair of friction platforms which may be manually or automatically deployed beneath the vehicle to lift it slightly from the underlying surface, thus causing the platforms to bear frictionally against the underlying surface to prevent further movement of the vehicle.

Figure 1:
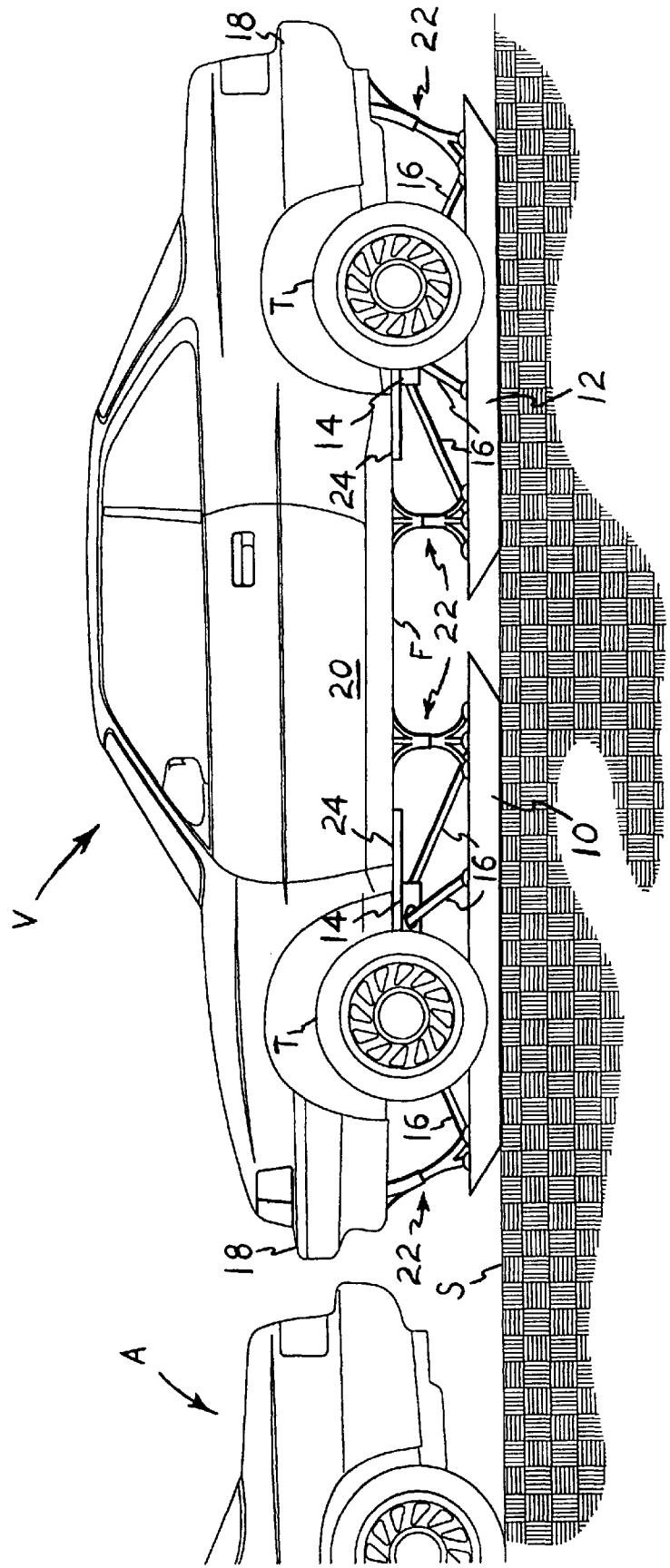
FIG. 1 is an environmental left side elevational view of a vehicle equipped with the present mechanism for dissipating vehicle collision forces, showing the mechanism in a deployed configuration.

FIG. 1 illustrates the general concept of the present invention, with a motor vehicle V (e.g., an automobile, truck, trailer, or any other motor vehicle having at least four wheels) having the present mechanism deployed therebelow. The basic mechanism of the present invention comprises first or forward and second or rearward friction platforms, respectively 10 and 12, which are deployed beneath the floor pan F of the vehicle V by a series of struts, described in detail further below. The two platforms 10 and 12 are disposed generally parallel to the floor pan F of the vehicle V at all times, whether in their raised or stored normal positions or in their lowered and deployed positions, as indicated in FIG. 1 and other drawing Figures. Each of the two platforms 10 and 12 generally comprises a relatively wide, flat plate having a large surface area (i. e., preferably totaling close to the projected plan view area of the vehicle), and coated upon their lower surfaces with a material having a high coefficient of friction (natural or synthetic rubber, etc.) to preclude sliding motion of the vehicle V relative to the underlying surface S when the platforms 10 and 12 are deployed.

The two platforms 10 and 12 are driven downwardly beneath the vehicle V by means of an actuator 14 disposed beneath the floor pan of the vehicle V and above each of the platforms 10 and 12. Each of the actuators 14 includes a plurality of actuator struts 16 extending therefrom, and connecting the actuator 14 with its respective forward or rearward platform 10 or 12, as appropriate. The actuators 14 serve to drive their actuator struts 16 outwardly, thus driving their respective platforms 10 and 12 downwardly due to the fixed (but angularly movable) locations of the actuator strut 16 attachments to the platforms 10 and 12. The details of this mechanism are discussed further below.

The vehicle V also includes a series of fore and aft contact structures 18 and lateral contact structures 20, disposed about the periphery P of the vehicle V. A plurality of stabilizing struts 22 extend generally inwardly from these contact structures 18 and 20 to connect them to their respective friction platforms 10 and 12. Due to the positionally fixed (but angularly movable) attachments of the stabilizing struts 22 with their platform 10 and 12 attachments, any inward movement of one of the contact structures 18 or 20 (e.g., the forward structure 18 of the vehicle V of FIG. 1, due to contact with another automobile A or other structure)

results in the actuation of a conventional impact sensor switch (shown schematically in FIG. 10) which triggers the actuation of the actuators 14 and deployment of their respective actuator struts 16, as discussed in greater detail further below.

The actuation of the two actuators 14 drives their respective actuator struts 16 outwardly from their actuators. As their attachment points to their respective platforms 10 and 12 are fixed and their lengths are also fixed, the result of this outward movement of the actuator struts 16 is to drive the platforms 10 and 12 downwardly beneath the vehicle V, as shown in FIG. 1. The lengths and travel of the actuator arms or struts 16 is established to extend the platforms 10 and 12 fully beneath the vehicle V just to the extent required to lift the four tires T of the vehicle V completely clear of the underlying surface S, with perhaps a fraction of an inch of clearance, as shown in FIG. 1. This requires several inches of downward travel for the platforms 10 and 12 in order to accommodate the conventional suspension travel of the vehicle V, thus lifting the vehicle V body several inches and parallel to the underlying surface S, as shown in FIG. 1. It will be noted that if the automobile A to the left of the vehicle V in FIG. 1 were equipped with a similar device, then both vehicles would be lifted to the same extent, thus maintaining equal bumper or contact structure heights.

Figure 2:
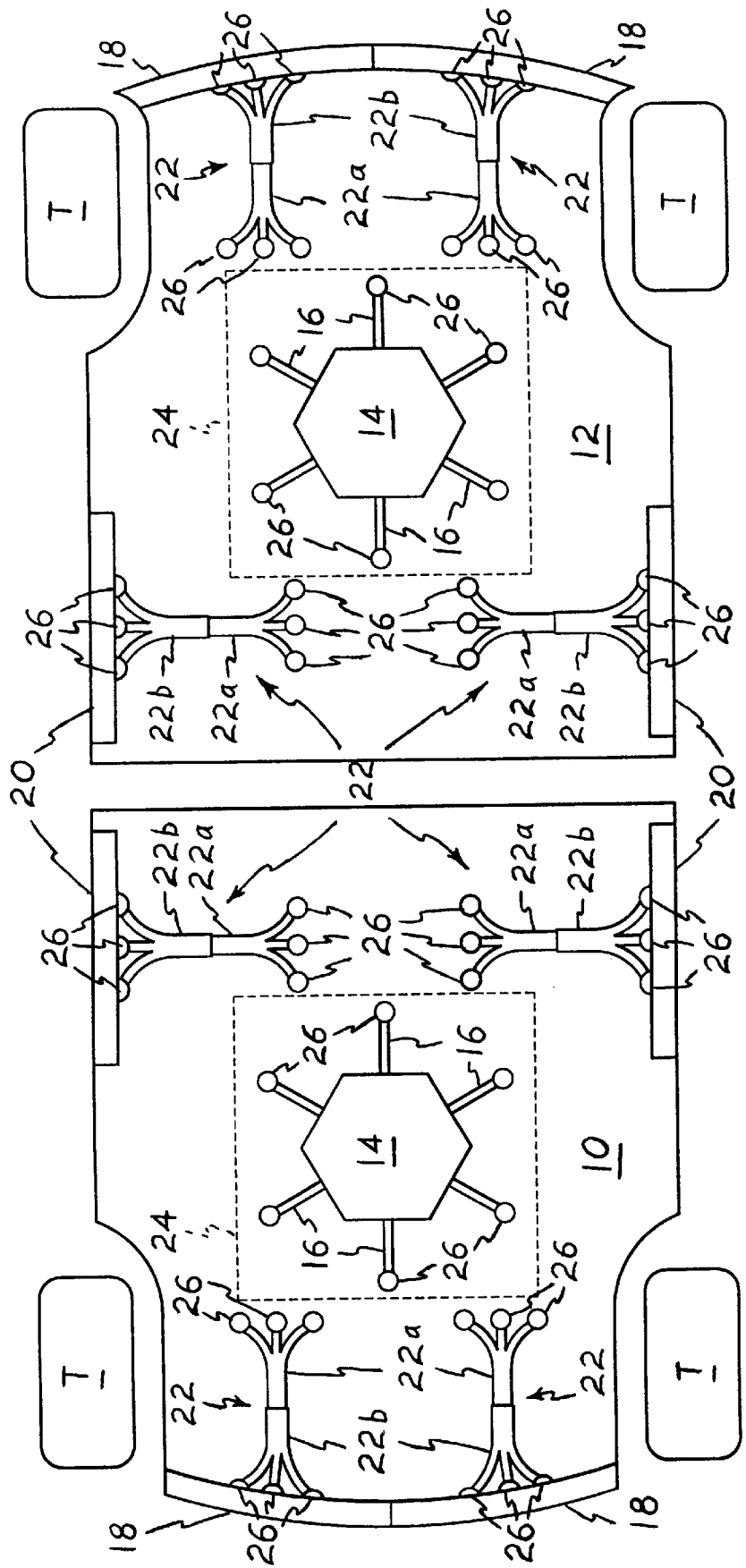
FIG. 2 is a bottom plan view of the vehicle and mechanism of FIG. 1, showing its general configuration.

FIG. 2 illustrates a plan view of the above described system and showing its general configuration, with the orientation being the same as shown in FIG. 1. The first or forward friction platform 10 is thus oriented to the left in FIG. 2, with the second or rearward platform 12 being positioned to the right side of the drawing sheet. The generally centrally disposed actuator 14 for each of the platforms 10 and 12 is secured to the floor pan of the vehicle by means of low friction bearing mounts 24, which provide the actuators 14 with some forward, rearward, and lateral movement to accommodate any asymmetric repositioning of various components of the system due to impact forces on any of the peripheral contact structures 18 and/or 20. These low friction mounts 24 are shown in greater detail in FIGS. 3 and 8 of the drawings, and discussed in greater detail further below.

It will be noted that each of the outermost or stabilizing struts 22 actually comprises two relatively telescoping portions, an inner strut 22a and outer strut 22b. This allows the central actuator struts 16 to drive the two friction platforms 10 and 12 downwardly, while still accommodating the greater distance between the contact structures 18 and 20 and the lowered or deployed friction platforms 10 and 12. In other words, the stabilizing struts 22 may telescope to elongate when the friction platforms 10 and 12 are lowered, without drawing the contact structures 18 and 20 inwardly. Normally, the stabilizing struts 22 are completely collapsed when the friction platforms 10 and 12 are in their raised positions, thus being ready to drive the friction platform(s) 10 and/or 12 downwardly in the event of an impact to any given contact structure or structures 18 and/or 20. The various struts 16 and 22 are each linked to their respective friction platform 10 or 12 by means of spherical socket joints or connectors 26, which allow the ends of the struts to move angularly relative to the platforms 10 and 12 as the platforms move downwardly during deployment, while still locking the strut ends positionally to the platforms.

Figure 3:
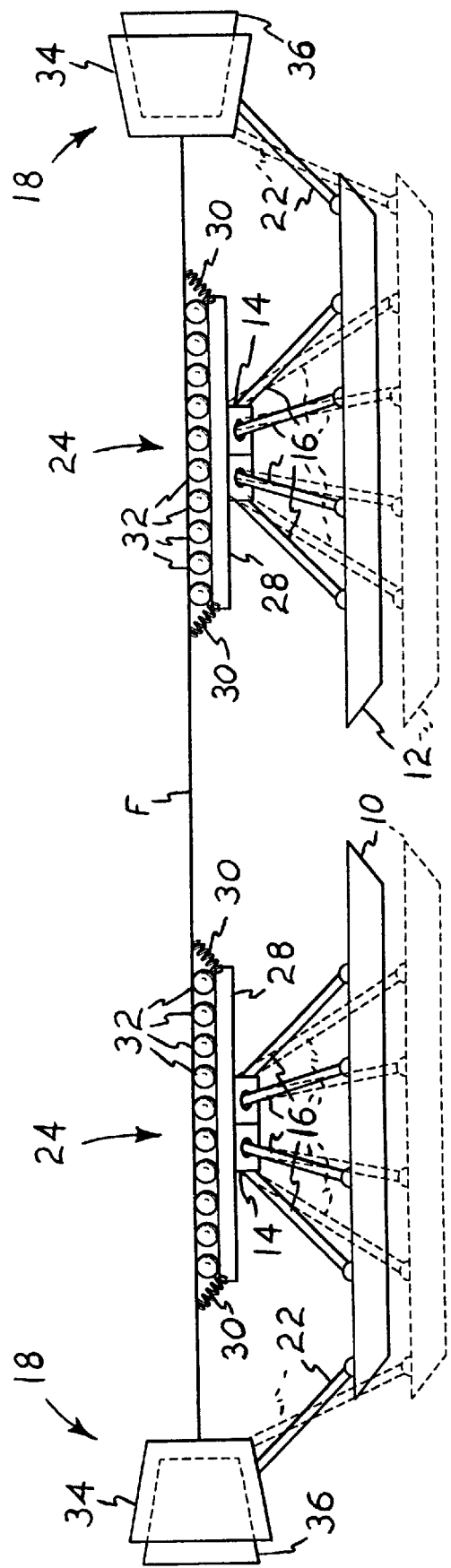
FIG. 3 is a side elevational view of the present mechanism, showing its raised configuration in solid lines and its deployed configuration in broken lines.

FIG. 3 provides a somewhat schematic side elevation view of the central actuators 14 for each of the two platforms 10 and 12 and the deployment of the platforms, as well as showing the general operation of the forward and rearward contact structures 18. As noted further above, each of the actuators 14 is mounted to a low friction bearing assembly 24, which is in turn secured to the underside of the floor pan F of the vehicle. Each of the low friction assemblies 24 comprises an actuator mounting plate 28 to which the actuator 14 is immovably attached, with the mounting plate in turn being movably secured to the overlying structure by a series of springs 30, with a plurality of ball or roller bearings 32 (or other suitable low friction structure) disposed between the actuator mounting plate 28 and the overlying structure (floor pan F, etc.). It will be noted that the typical floor pan of most automobiles may be somewhat uneven in shape. The low friction actuator mounting structure of the present invention may accommodate such an uneven configuration by positioning the various bearings 32 to define a flat plane, by mounting them at appropriate distances from the uneven surface of the floor pan as necessary.

FIG. 3 also illustrates the general structure and relationship of the forward and rearward contact structures 18 to the remainder of the structure. Each of the contact structures 18 generally comprises a rigid frame 34 which is immovably affixed to the peripheral structure of the vehicle, with a movable component 36 cooperatingly installed therein. The lateral contact structures 20 have a similar configuration.

Figure 5B:
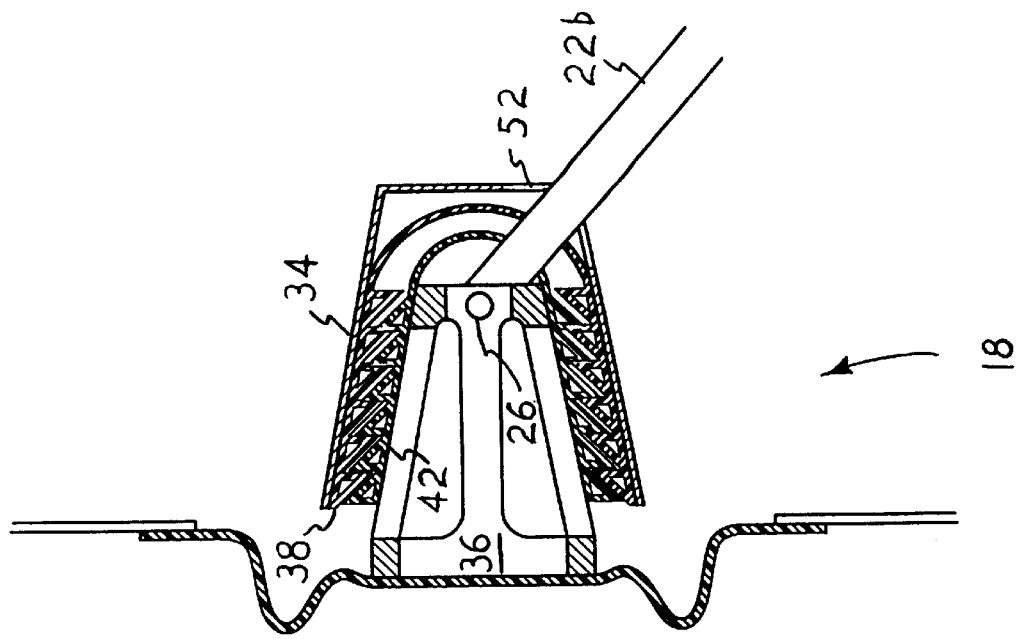
FIG. 5B is a side elevational view in section of the rigid frame contact structure of FIG. 5A, showing the structure in a collapsed configuration after impact.
Figure 5A:
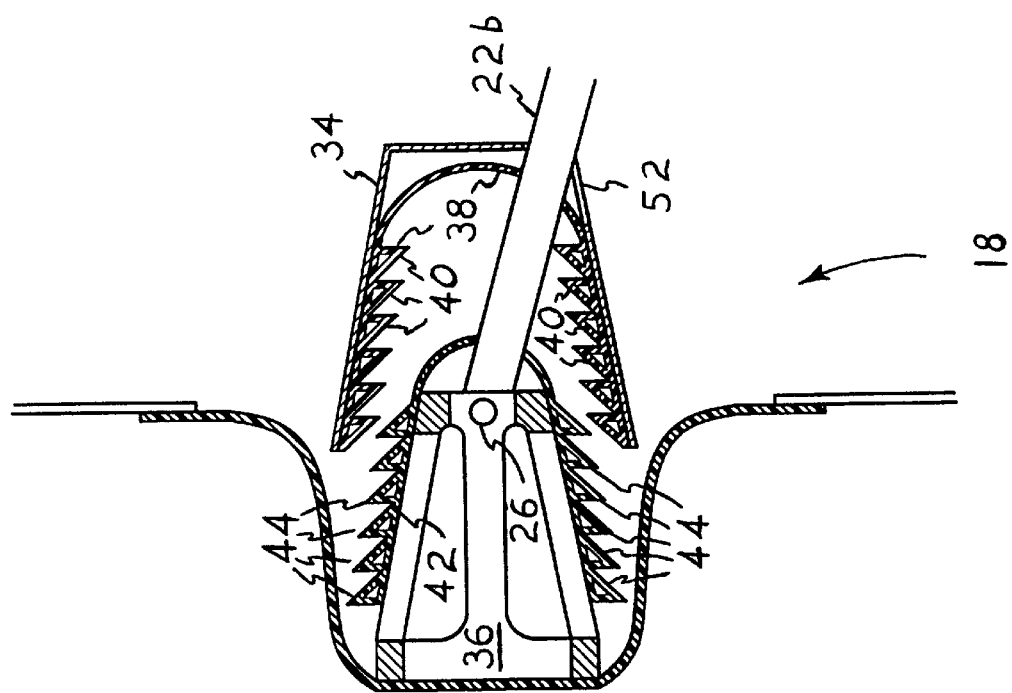
FIG. 5A is a side elevational view in section of the rigid frame contact structure of FIG. 4 in a normal, extended position.
Figure 6A:
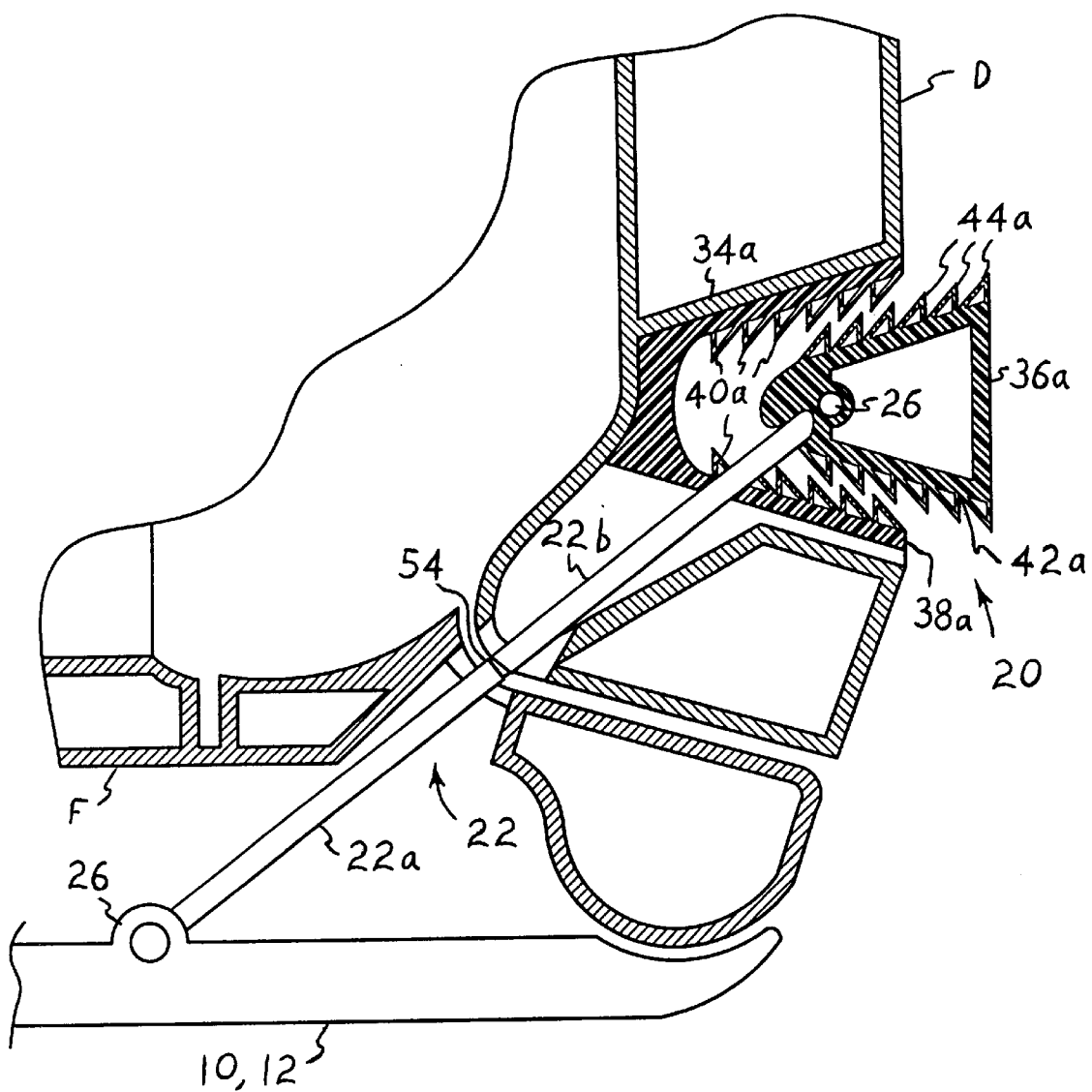
FIG. 6A is a side elevational view in section of one of the side rigid frame contact structures of the present invention in a normal, extended position, showing various details thereof.
Figure 6B:
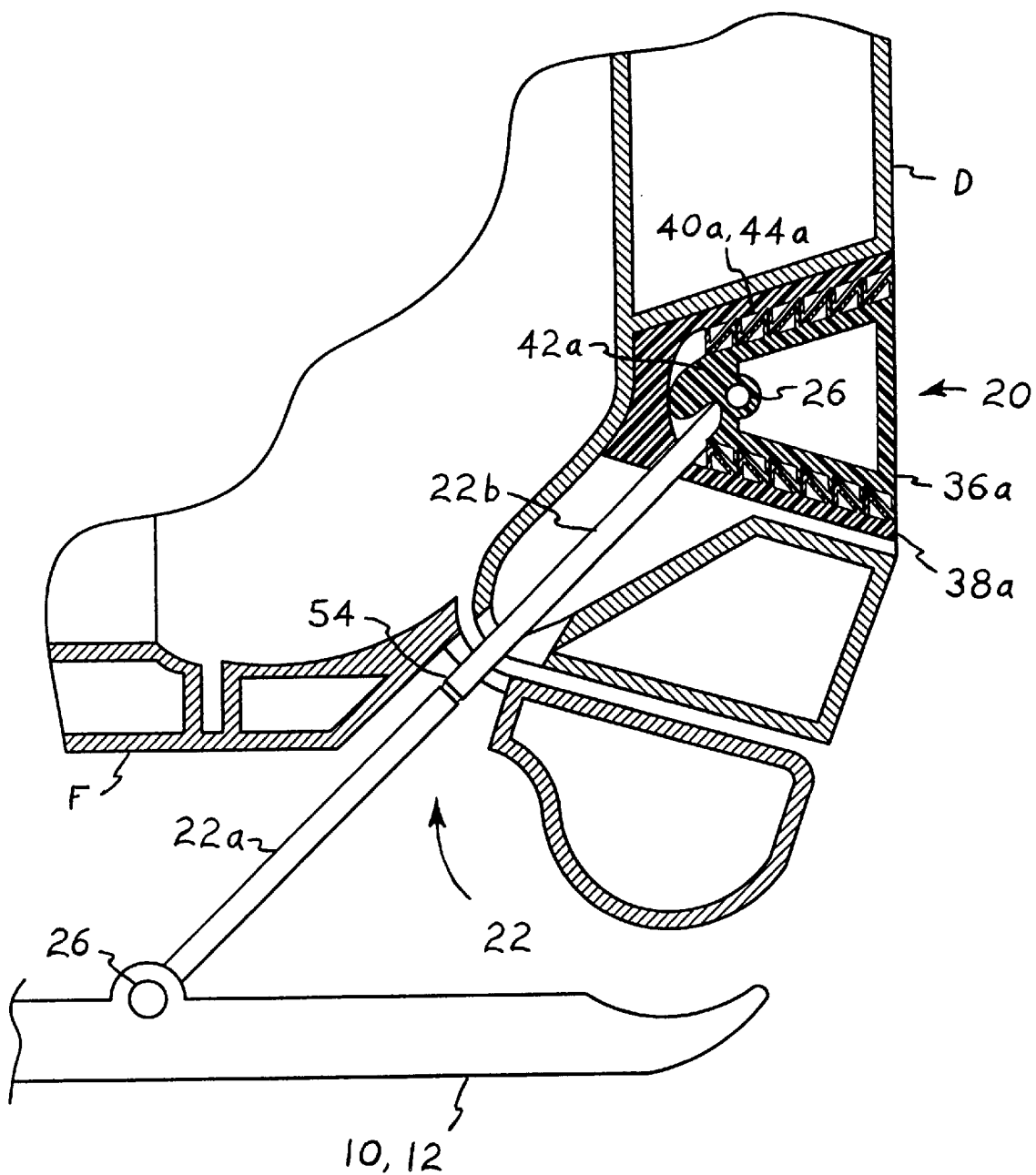
FIG. 6B is a side elevational view in section of the side rigid frame contact structure of FIG. 6A, showing the structure in a collapsed configuration after impact.

FIGS. 4 through 5B provide detailed illustrations of the structure and operation of the forward and rearward contact structures 18, with FIGS. 6A and 6B illustrating the structure and operation of the similar lateral contact structures 20. In FIG. 4, the rigid frame 34 will be seen to include a generally U-shaped channel 38 installed therein, formed of a suitable resilient elastomer product (rubber, etc.). The channel 38 has its concave interior facing outwardly and includes a series of inwardly facing laterally disposed ridges or teeth 40, with each of the ridges 40 having an inwardly sloping outer face and an opposite generally vertical inner face. The movable component 36 of the assembly 18 comprises an elongate, generally U-shaped resilient elastomer extension 42 which engages within the outer fixed channel 38 of the rigid frame 34. The outer surface of the movable elastomer extension 42 includes a series of outwardly facing laterally disposed elastomer ridges 44, with the outwardly facing surfaces of the ridges 44 being essentially vertical and the opposite inwardly facing surfaces being sloped outwardly away from the center of the structure, as shown in FIGS. 4 through 5B of the drawings.

It will be seen that the facing sloped surfaces of the resilient ridges 44 of the movable component may be forced inwardly to engage the cooperating ridges 40 of the rigid frame 34, in the event of an impact upon the contact structure 18. The interaction between the two sets of ridges 40 and 44, result in the absorption of considerable impact force in a collision, with further impact absorption means being described below.

It will be noted that each of the ridges or teeth 40 and 44 of the contact structure 18 are hollow. A manifold 46 is provided to inflate the several hollow ridges 40 and 44 respectively of the fixed and movable resilient components 38 and 42. (Only a single manifold 46 is illustrated in FIG. 4, for clarity in the drawing Figure. It will be understood that inflation pressure may be provided to the inflatable ridges 44 of the movable component 36 in the same manner, by a conventional flexible tube connecting the movable component 36 to the pressure source.) The manifold 46 is supplied with pressure from a conventional pneumatic pump 48, which is in turn powered by an electric motor 50 which may receive electrical power from the conventional electrical system of the vehicle V to which the present system is installed.

The above described pneumatic inflation system allows the rigidity of the cooperating ridges 40 and 44 to be adjusted as desired, depending upon the anticipated impact force which may be encountered, the mass of the vehicle V, and other factors. A programmable chip or similar circuit may be provided to adjust the pneumatic pressure automatically as desired, depending upon impact forces. Such chips are conventionally used to determine the inflation speed and force of "air bag" safety restraint systems in certain automobiles, depending upon the weight sensed in the passenger seat and other factors. Such technology is applicable to the present pneumatic system, as well.

FIGS. 5A and 5B illustrate "before" (FIG. 5A) and "after" (FIG. 5B) elevation views in section of a contact structure 18 of the present invention. In FIG. 5A, the movable portion 36 is deployed outwardly from the rigid frame portion 34, in a normal pre-collision condition. The outer end or portion 22b of the telescoping stabilizing strut is arcuately secured to the movable contact structure at a point 26, and extends inwardly to its mating inner portion to connect to the corresponding friction platform 10 or 12, as shown in FIGS. 1 through 3 of the drawings. A slot or passage 52 is provided through the back of the fixed shell or housing 34 of the assembly 18, for clearance for the strut end 22b. The edges of the passage 52 may also serve as angular stops or limits for the arcuate travel of the strut end 22b.

In FIG. 5B, the outermost movable portion 36 of the contact structure 18 has been forced inwardly into the channel 38 of the fixed portion 34 of the assembly. The adjustable resistance of the hollow ridges 40 and 44 result in increasing resistance to the collapse of the movable portion 36 into the fixed or rigid frame 34 of the assembly 18, as more and more of the elongate ridges or extensions 40 and 44 engage one another as the movable outer portion 36 is forced into the fixed frame 34. It will be noted in FIGS. 5A and 5B of the drawings that the cooperating fixed and movable channels 38 and 42 are trapezoidal in cross section, thus further increasing the resistance to collapse as the movable component 36 is forced into the fixed component 34.

The laterally disposed contact structures 20 operate on a principle similar to that described above for the forward and rearward contact structures 18. However, the lateral structures 20 may be installed within the lower portions of the doors D of the vehicle V, and must be free to open and close along with the doors D. This is accomplished by a ball and cup joint assembly 54 provided at a generally medial point along the stabilizing strut 22, extending downwardly and inwardly from the movable portion 36a of the contact structure 20.

The laterally disposed contact structures 20 are otherwise similar to the fore and aft contact structures 18, with the lateral structures 20 including a rigid frame component 34a and movable component 36a which may collapse inwardly into the hollow resilient channel 38a of the rigid frame structure 34a. Each resilient member 38a and 42a includes a plurality of elongated cooperating ridges, respectively 40a and 44a, which engage one another when the movable outer portion 36a of the structure is forced into the fixed frame 34a. The outer or upper end of the strut 22, i. e., strut portion 22b, is pivotally connected to the movable structure 36a at a point 26. It will be noted that the elongate resilient ridges 40a and 44a are configured similarly to their counterparts 40 and 44 of the contact structures 18, with hollow cores or centers. These may be selectively inflated to some predetermined pressure to control the resistance to collapse of the movable portion 36a into the fixed structure 34a, by means of a pneumatic system similar to that shown in FIG. 4 of the drawings.

FIG. 6B illustrates the lateral contact structure 20 of the present system in a collapsed condition, with the movable outer portion 36a having been pushed inwardly into the interior of the fixed rigid frame portion 34a. The resilient ridges 40a and 44a have engaged one another, with the engagement process providing selectively increasing resistance to collapse, depending upon the inflation pressure of the hollow ridges 40a and 44a. It will be noted that the outboard portion 22b of the stabilizing strut 22 has been pushed inwardly and downwardly, thus driving the inboard portion 22a of the strut 22 in a similar manner to drive the friction platform(s) 10 and/or 12 downwardly beneath the vehicle.

Figure 7:
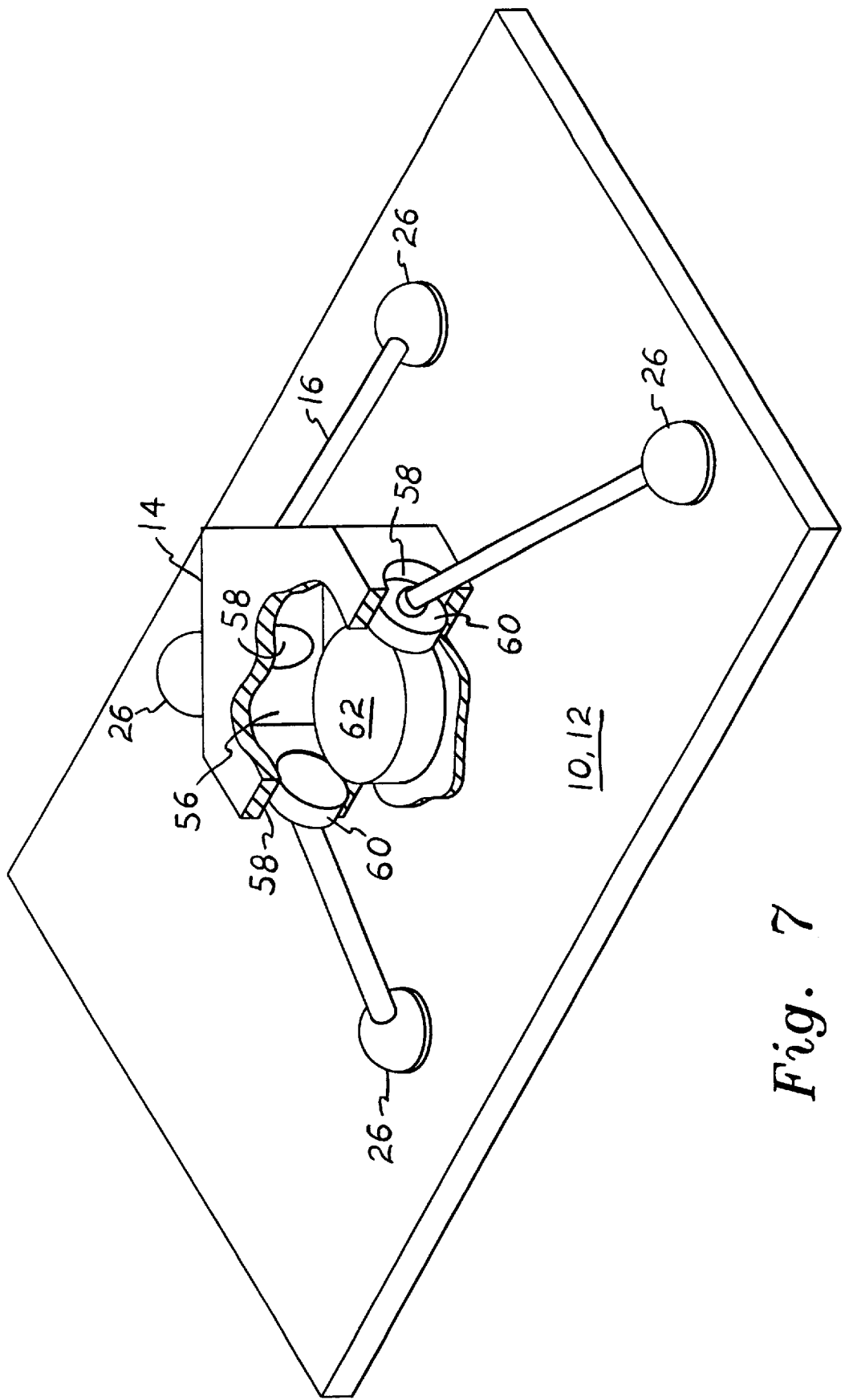
FIG. 7 is a perspective view in section of one of the pyrotechnic actuators of the present mechanism, showing its general configuration.
Figure 10:
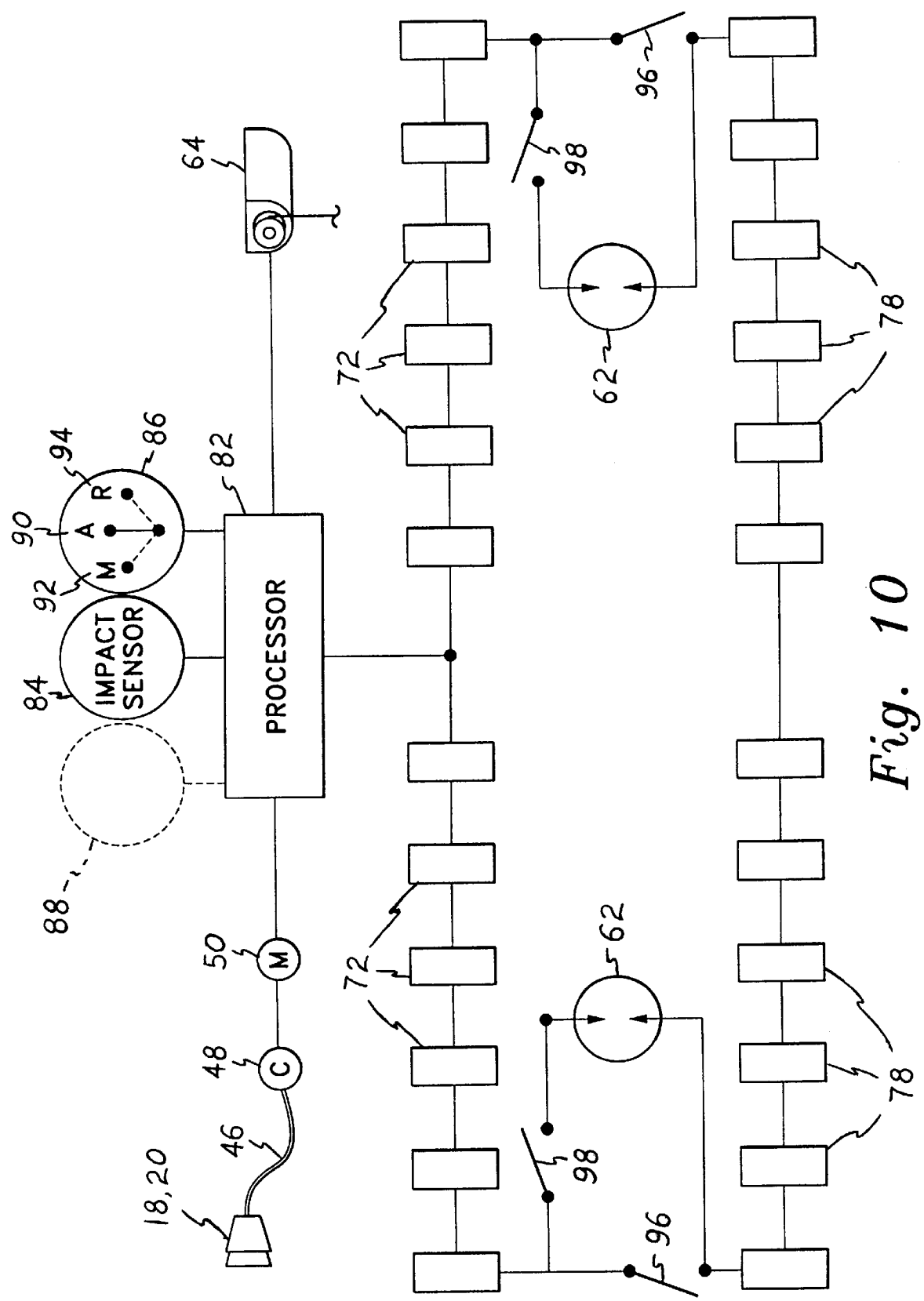
FIG. 10 is a schematic diagram showing the general relationship of the various components of the present mechanism or system.

FIG. 7 is a broken away perspective schematic rendition of one of the actuators 14 of the present mechanism. The actuator 14 includes a hollow interior 56 with a plurality of cylinders 58 and corresponding pistons 60 generally radially disposed therein. Preferably, a series of six cylinders 58 and pistons 60 is provided in each actuator 14, as shown in FIG. 2. The hollow core 56 includes a pyrotechnic charge 62 therein which is automatically detonated in the event of a collision by conventional means, such as that used in the actuation of a conventional explosive air bag system; the general schematic of such an actuating system for the present invention is depicted in FIG. 10. An actuator strut 16 extends from each of the pistons 60. When the charge 62 is fired, the pistons 60 are forced outwardly in their respective cylinders 58, thus driving the struts 16 outwardly and downwardly to drive the friction platform 10 and/or 12 downwardly to lift the vehicle.

Figure 8:
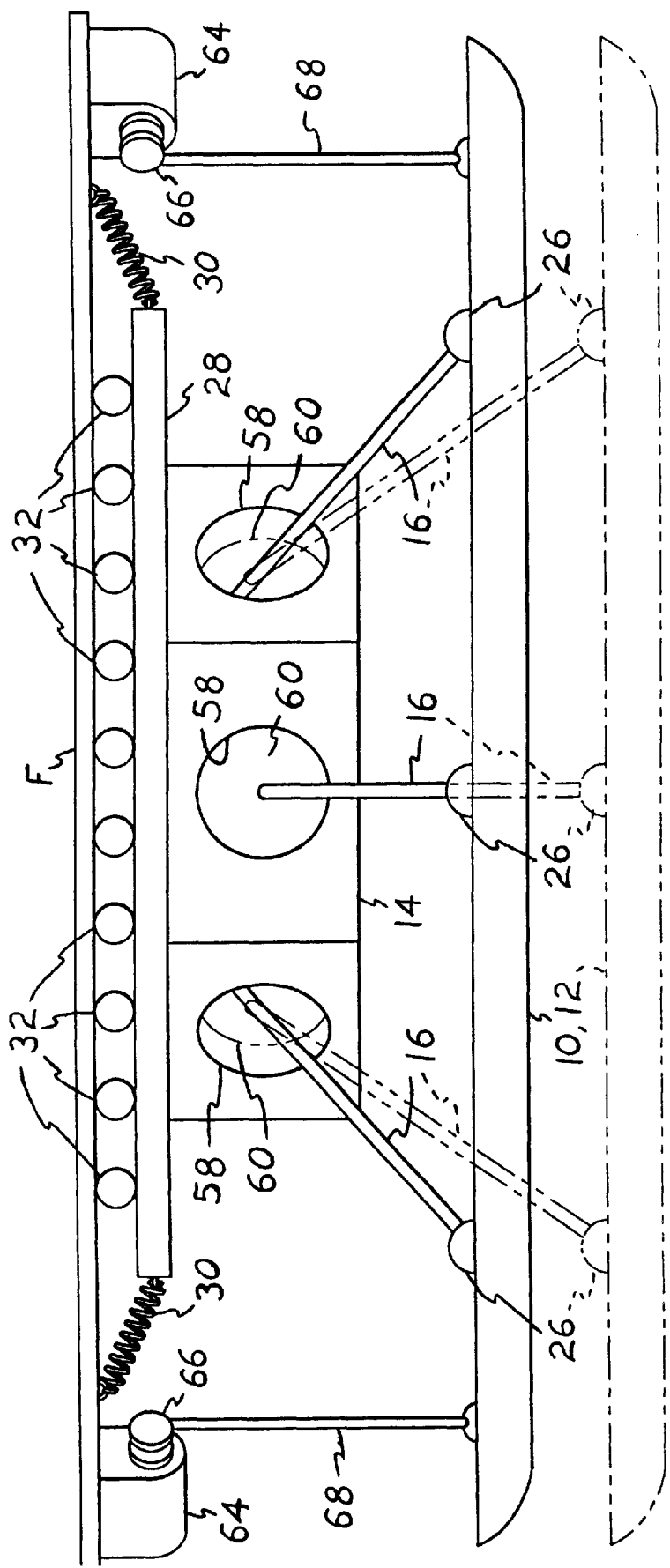
FIG. 8 is a side elevation view of one of the pyrotechnic actuators of the present mechanism, showing the device in a normal, raised position in solid lines and in a deployed position in broken lines, and further details thereof.

FIG. 8 provides a side elevation view of the actuator and friction platform mechanism generally shown in FIG. 7, but providing further details. It will be noted that the actuator 14 is not directly mounted to the floor pan or frame F of the vehicle, but rather is immovably affixed to a mounting plate 28 which is in turn movably secured beneath the floor pan F. This mechanism is also illustrated in FIG. 3 of the drawings and described in detail further above.

It will be seen that the forces developed by the pyrotechnic charges in forcing the friction platforms 10 and 12 downwardly is considerable, with the required force being sufficient to lift the entire vehicle just clear of the underlying surface. The present mechanism includes means for holding the platforms 10 and 12 in their extended positions (illustrated in FIG. 9, and discussed further below) and also for retracting the platforms 10 and 12 against the spring force provided for holding the platforms 10 and 12 in their extended positions. In FIG. 8, a pair of opposed electric winches 64 are disposed at opposite sides of the platforms 10 and 12, immediately outboard of the movable mounting plate 28 to which the actuator 14 is affixed. These winches 64 drive pulleys 66 which in turn produce a retractile or tensile force upon cables 68, with the cables 68 being affixed to the sides of the friction platforms 10 and 12. Thus, when it is necessary to move the vehicle after deployment of the friction platforms 10 and 12, the winches 64 are actuated to draw the friction platforms 10 and 12 upwardly and back to their normally retracted positions.

Figure 9:
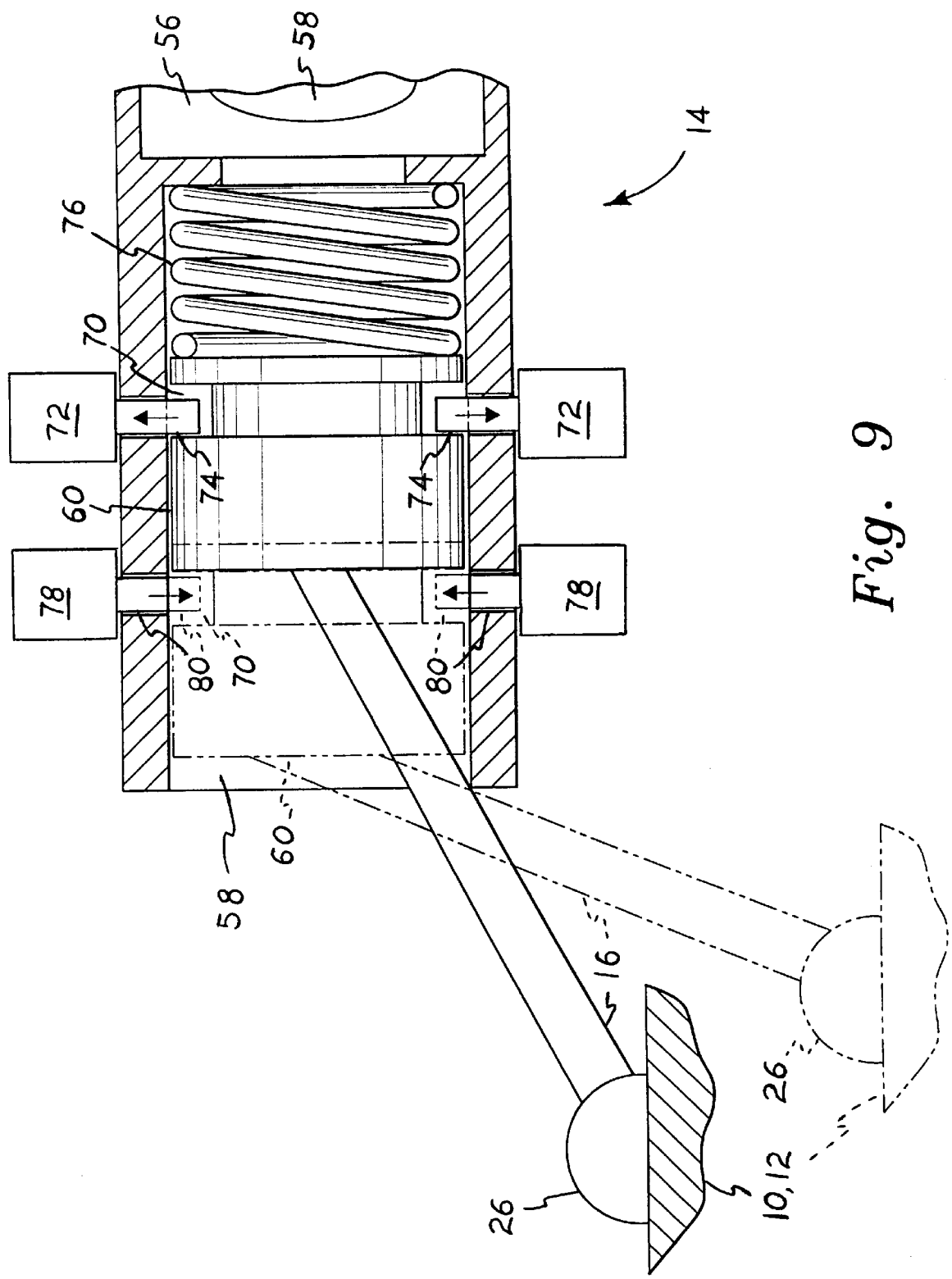
FIG. 9 is a detailed elevation view in section of a single actuator piston mechanism of one of the pyrotechnic actuators of the present system, showing the provision of mechanical spring means therewith for deployment of the system.

FIG. 9 discloses a detailed elevation view in section of one of the cylinder 58 and piston 60 assemblies of an actuator 14, showing the means both for holding the pistons 60 (and thus their associated struts 16 and friction platforms 10 and 12) in an extended position, and also for holding the pistons 60 (and attached structures) in a retracted position as desired. It will be noted that the piston 60 includes a circumferential relief or groove 70 adjacent its inboard end. A first series of solenoids 72 are disposed about the cylinder 58 to selectively extend or retract pins 74 through passages in the cylinder walls, to engage the piston groove 70 as desired. These first solenoids 72 are positioned closer to the center of the actuator 14, and thus hold the piston 60 in a retracted position when the corresponding pins 74 are engaged within the groove 70 of the piston 60. This state holds the friction platforms 10 and 12 in their normally retracted location, and also retains the piston 60 against its extension spring 76, provided for manual deployment of the platforms.

A second set of solenoids 78 is located further outwardly along the cylinder 58, with associated pins 80 serving to engage the piston groove 70 when the piston 60 is in its fully extended position, shown in broken lines in FIG. 9. These second solenoids 78 and their piston lock pins 80 lock the piston 60 in its fully extended position, thus locking the corresponding actuator struts 16 in their extended positions and locking the friction platforms 10 and 12 in their extended positions beneath the vehicle, as shown in FIG. 1 of the drawings.

The present system is normally in a retracted state, with the friction platforms 10 and 12 drawn upwardly against the underside of the vehicle. The first solenoid pins 74 rest in a normally extended position, engaging the groove or relief 70 of the piston 60, while the second solenoid pins 80 are in normally retracted positions, thus clearing the way for the rapid extension of the piston 60 (and corresponding strut 16 and friction platforms 10 and 12, as appropriate) upon demand. However, when the system is actuated (either automatically or manually) the first solenoids 72 are actuated to retract their pins 74 from their normally extended positions, allowing the piston 60 to extend outwardly within its corresponding cylinder 58, either by automatic means (i.e., the pyrotechnic charge 62) or manual means (i.e., the extension of the normally compressed spring 76). When the piston 60 has traveled outwardly along the cylinder bore 58, the second solenoids 78 are actuated, to drive their pins 80 inwardly to engage the relief groove 70 in the piston 60, thus holding the piston 60 (and struts 16 and friction platforms 10 and 12) in an extended position.

Retraction of the friction platforms 10 and 12 is accomplished by withdrawing the second solenoid pins 80 from their engagement with the piston 60 groove 70, and actuating the winch 64 mechanism illustrated schematically in FIG. 8 and discussed further above. When the platforms 10 and 12 (and associated struts 16 and pistons 60) have been retracted to their normal positions, the first solenoids 72 are released to allow their pins 74 to engage the piston groove 70 to hold the system in its retracted state once again.

FIG. 10 is a general electrical flow chart of the above described system. The heart of the system may be considered to be a microprocessor 82, through which signals from one or more impact sensors 84 ("g" switch, as used conventionally in airbag deployment) and mode selector switch 86 are processed. The microprocessor 82 also controls the output of the motor(s) 50 driving the pneumatic pump(s) 48 which provide inflation pressure for the hollow ridges 40, 44, 40a, and 44a of the contact structures 18 and 20, the friction platform retraction winch 64, and may also operate an optional status display 88, similar to the airbag warning lights conventionally found in most motor vehicles.

The microprocessor 82 also communicates with all of the first and second series of solenoids 72 and 78, controlling their operation (and that of the detonators 62) according to appropriate programming and the position of the selector switch 86. The selector switch 86 will be seen to have three positions: A central or "A" (Automatic) position 90, a second "M" (Manual) position 92, and a third "R" (Retract) position 94. Manual and automatic actuator switches, respectively 96 and 98, are also provided with the present system, and may be physically located as a part of the microprocessor circuitry, or elsewhere in the system as desired. The switch 86 is normally left in the "A" position 90, for automatic operation in the event of a collision. The "M" position 92 may be used to manually deploy the friction platforms by means of the springs 76 without activating the detonators 62, while the "R" position 94 is used to retract the platforms after deployment.

If the selector switch 86 is in its automatic position 90 during a collision, the impact forces on one or more of the contact structures 18 and/or 20 actuate at least one impact sensor 84 which communicates with the microprocessor 82. The microprocessor 82 sends a signal to first and second solenoids 72 and 78, causing the first solenoids to retract their pins 74, allowing springs 76 to push their respective pistons 60 outwardly within the cylinders 58.

However, the spring actuation of the pistons 60 is not sufficiently fast as to provide the desired rapid deployment of the friction platforms 10 and 12 during a collision. Accordingly, the microprocessor 82 also closes the automatic detonator switches 98 to complete a series circuit through the first solenoids 72, the detonators 62, and after a short delay to allow for travel of the pistons 60, through the second solenoids 78 to cause solenoids 78 to extend their pins 80 to lock the pistons 60 in their extended positions, thereby holding the struts 16 and friction platforms 10 and 12 in downwardly deployed positions. This action results in complete stoppage of vehicle movement in a collision, even if the driver's foot is jarred from the brake due to the impact.

When recovery of the vehicle is desired after the collision, the selector switch 86 need only be turned to the retract position 94. This retracts the secondary solenoid pins 80 and activates the friction platform retraction winches 64. When retraction is complete, the first solenoids 72 are released to insert their pins 74 into the grooves 70 of the pistons 60, thus locking the mechanism in the fully retracted position.

While the above described automated system may prove valuable in the event of a collision, it will be seen that the actuation of the two detonators 62 is not desirable at other times when a preplanned deployment of the system is desired. For example, the present system and mechanism may be used as a theft preventive measure, by precluding the towing of the vehicle when the friction platforms are deployed. In the event that such manual actuation is desired, the driver need only move the selector switch 86 from the "A" position 90 to the "M" position 92, to bypass the detonators 62. When manual actuation is accomplished, the microprocessor 82 does not close the two automatic detonator switches 98. Rather, these two switches 98 remain open to preclude firing of the pyrotechnic charges or detonators 62. Instead, the microprocessor 82 causes the closure of the two manual switches 96, completing the circuit to the solenoids 72 and 78 and causing them to activate as described above during the description of automatic operation of the present invention. The outward pressure of the springs 76 is sufficient to deploy the system when manual activation is selected.

The above described manual operation means (i.e., turning the selector switch 86 to the manual position 92), also enables the system to be actuated after the pyrotechnic charges have been fired. Thus, after retraction of the friction platforms 10 and 12 for movement of the vehicle after a collision (or for whatever reason the charges 62 were detonated), the platforms 10 and 12 may be manually extended to permit access to the actuators for replacement of the pyrotechnic charges 62 as required.

In summary, the present mechanism for dissipating vehicle collision forces provides a means for immobilizing a vehicle at the moment of impact, thus reducing or precluding significant damage thereto and injury to its occupants. The system serves to minimize interaction between vehicle and another impacted object by progressive actuation of the trapezoidal contact structure and associated mechanisms, while maximizing interaction between vehicle and underlying surface by the actuator and friction platform. The present system and mechanism provides both automated activation by means of impact sensing devices and pyrotechnic actuators, but may also be manually deployed by means of an electromechanical system involving the selective release of solenoids and spring pressure for deployment. Thus, the present invention will not only find use in vehicle collisions and impacts, but will also serve as an anti-theft device through its manual deployment as well.

It is to be understood that the present invention is not limited to the embodiments described above, but encompasses any and all embodiments within the scope of the following claims.

I claim:

1. A vehicle safety mechanism for dissipating collision forces against an underlying surface, comprising:

at least a forward and a rearward friction platform movably disposed beneath the floor pan of a conventional motor vehicle and disposed generally parallel thereto, the motor vehicle having a width;

each said friction platform comprising a plate for bearing against the underlying surface beneath the motor vehicle, each said plate having a width corresponding substantially to the width of the motor vehicle; and means for selectively extending each said friction platform downwardly beneath the vehicle and generally parallel to the floor pan of the vehicle, for lifting the vehicle at least slightly above the underlying surface and generally parallel thereto.

2. The mechanism according to claim 1, wherein said means for selectively extending each said friction platform downwardly beneath the vehicle comprises:

an actuator disposed beneath the floor pan of the vehicle and above each said friction platform; and a plurality of selectively extendible struts extending from each said actuator, and connecting each said actuator with a respective said friction platform.

3. The mechanism according to claim 1, wherein said means for selectively extending each said friction platform downwardly beneath the vehicle comprises:

a plurality of peripheral contact structures disposed about the periphery of the vehicle; and a plurality of selectively extendible struts extending from each of said contact structures and connecting each of said contact structures to a respective said friction platform.

4. The mechanism according to claim 3, wherein each of said contact structures comprises:

a rigid frame immovably secured to the vehicle periphery;

a movable component cooperatingly secured to said rigid frame;

said rigid frame having an outwardly facing channel formed therein; and said movable component having an inwardly facing elongate extension cooperating with said channel of a respective said rigid frame.

5. The mechanism according to claim 4, wherein each said rigid frame and said cooperating movable component each include a plurality of mutually engageable laterally disposed ridges, with said ridges being formed of a resilient material.

6. The mechanism according to claim 5 wherein each of said ridges is hollow, including means for selectively inflating said hollow ridges.

7. The mechanism according to claim 1, wherein said means for selectively extending each said friction platform downwardly beneath the vehicle comprises:

an actuator disposed beneath the floor pan of the vehicle and above each said friction platform;

a plurality of selectively extendible struts extending from each said actuator, and connecting each said actuator with a respective said friction platform; and each said actuator including pyrotechnic means for selectively extending said struts for driving a respective said platform downwardly beneath the vehicle.

8. The mechanism according to claim 7, including automated means for actuating each said actuator.

9. The mechanism according to claim 1, wherein said means for selectively extending each said friction platform downwardly beneath the vehicle comprises:

an actuator disposed beneath the floor pan of the vehicle and above each said friction platform;

a plurality of selectively extendible struts extending from each said actuator, and connecting each said actuator with a respective said friction platform; and each said actuator including spring means for selectively extending said struts for driving a respective said platform downwardly beneath the vehicle.

10. The mechanism according to claim 9, including manual means for actuating each said actuator.

11. A motor vehicle and safety mechanism therewith for dissipating collision forces thereto against an underlying surface, comprising in combination:

a motor vehicle having at least a floor pan, a width, and a periphery;

a collision force dissipating mechanism having at least a forward and a rearward friction platform movably disposed beneath said floor pan of said motor vehicle and disposed generally parallel thereto;

each said friction platform comprising a plate for bearing against the underlying surface beneath said motor vehicle, each said plate having a width corresponding substantially to the width of the motor vehicle; and means for selectively extending each said friction platform downwardly beneath said vehicle and generally parallel to said floor pan of said vehicle, for lifting said vehicle at least slight above the underlying surface and generally parallel thereto.

12. The motor vehicle and safety mechanism combination according to claim 11, wherein said means for selectively extending each said friction platform of said mechanism downwardly beneath said vehicle comprises:

an actuator disposed beneath said floor pan of said vehicle and above each said friction platform of said mechanism; and a plurality of selectively extendible struts extending from each said actuator, and connecting each said actuator with a respective said friction platform.

13. The motor vehicle and safety mechanism combination according to claim 11, wherein said means for selectively extending each said friction platform of said mechanism downwardly beneath said vehicle comprises:

a plurality of peripheral contact structures disposed about said periphery of said vehicle; and a plurality of selectively extendible struts extending from each of said contact structures and connecting each of said contact structures to a respective said friction platform.

14. The motor vehicle and safety mechanism combination according to claim 13, wherein each of said contact structures of said mechanism comprises:

a rigid frame immovably secured to said periphery of said vehicle;

a movable component cooperatingly secured to said rigid frame of said mechanism;

said rigid frame having an outwardly facing channel formed therein; and said movable component having an inwardly facing elongate extension cooperating with said channel of a respective said rigid frame.

15. The motor vehicle and safety mechanism combination according to claim 14, wherein each said rigid frame and said cooperating movable component of said mechanism each include a plurality of mutually engageable laterally disposed ridges, with said ridges being formed of a resilient material.

16. The motor vehicle and safety mechanism combination according to claim 15 wherein each of said ridges is hollow, including means for selectively inflating said hollow ridges.

17. The motor vehicle and safety mechanism combination according to claim 11, wherein said means for selectively extending each said friction platform of said mechanism downwardly beneath said vehicle comprises:

an actuator disposed beneath said floor pan of said vehicle and above each said friction platform of said mechanism;

a plurality of selectively extendible struts extending from each said actuator, and connecting each said actuator with a respective said friction platform of said mechanism; and each said actuator including pyrotechnic means for selectively extending said struts for driving a respective said platform of said mechanism downwardly beneath said vehicle.

18. The motor vehicle and safety mechanism combination according to claim 17, including automated means for actuating each said actuator of said mechanism.

19. The motor vehicle and safety mechanism combination according to claim 11, wherein said means for selectively extending each said friction platform of said mechanism downwardly beneath said vehicle comprises:

an actuator disposed beneath said floor pan of said vehicle and above each said friction platform of said mechanism;

a plurality of selectively extendible struts extending from each said actuator, and connecting each said actuator with a respective said friction platform of said mechanism; and each said actuator including spring means for selectively extending said struts for driving a respective said platform of said mechanism downwardly beneath said vehicle.

20. The motor vehicle and safety mechanism combination according to claim 19, including manual means for actuating each said actuator of said mechanism.

* * * * *